J. I. RICHEY.
MEANS FOR LUBRICATING LEAF SPRINGS.
APPLICATION FILED SEPT. 14, 1918.
1,352,915.
Patented Sept. 14, 1920.
2 SHEETS—SHEET 1.
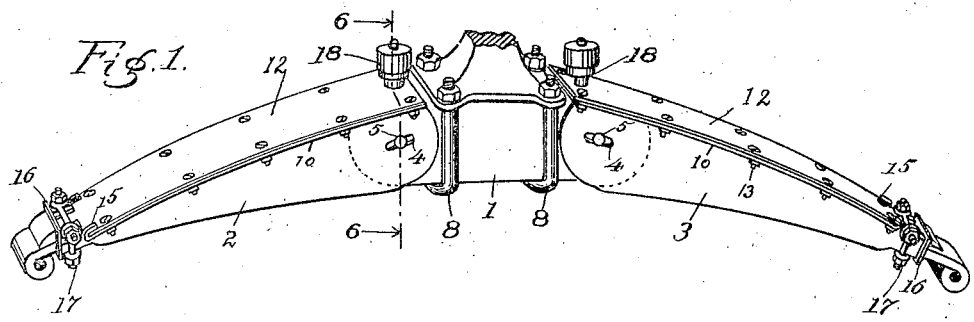
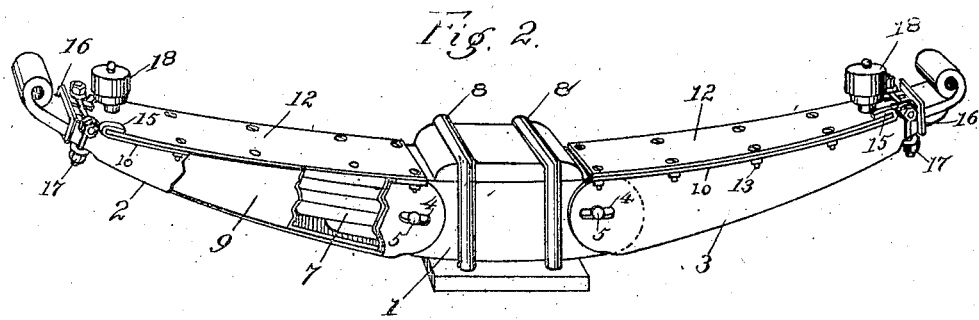
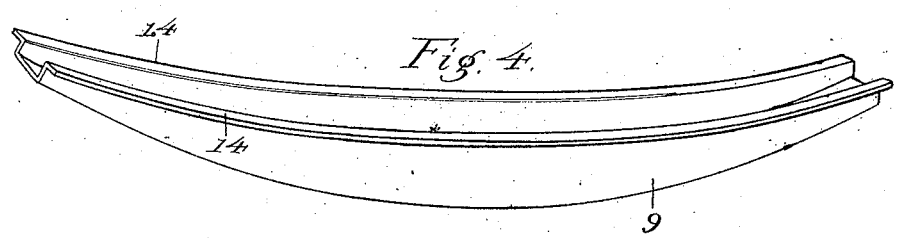
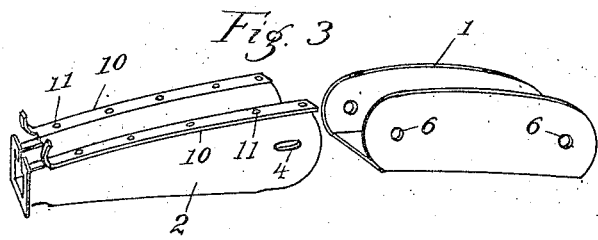
Inventor:
James I. Richey.
By Arthur N. Ewald,
Attorney.

J. I. RICHEY.
MEANS FOR LUBRICATING LEAF SPRINGS.
APPLICATION FILED SEPT. 14, 1918.
1,352,915.
Patented Sept. 14, 1920.
2 SHEETS—SHEET 2.
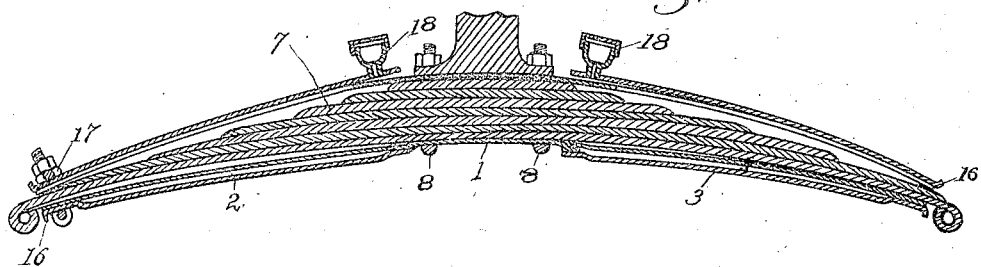
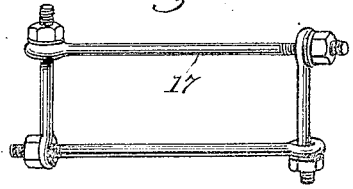
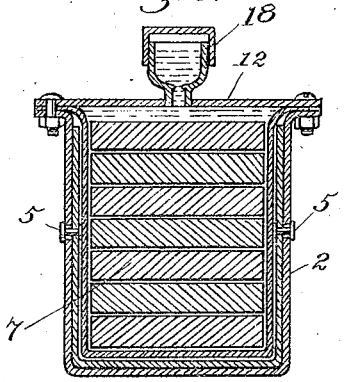
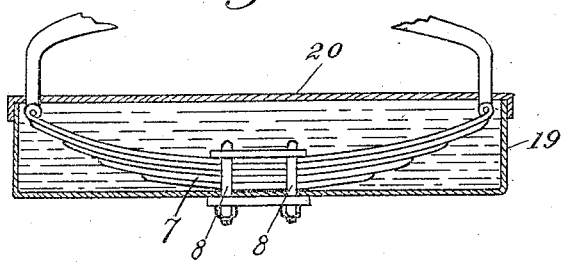
Inventor:
James I. Richey,
By Arthur H. Ewald,
Attorney.

UNITED STATES PATENT OFFICE.

JAMES I. RICHEY, OF CINCINNATI, OHIO.

MEANS FOR LUBRICATING LEAF-SPRINGS.

1,352,915.

Specification of Letters Patent. Patented Sept. 14, 1920.

Application filed September 14, 1918. Serial No. 254,092.

*To all whom it may concern:*

Be it known that I, JAMES I. RICHEY, a citizen of the United States, and resident of Cincinnati, in the county of Hamilton and State of Ohio, have invented certain new and useful Improvements in Means for Lubricating Leaf-Springs, of which the following is a full, clear, and exact description, reference being had to the accompanying drawings, forming a part of this specification.

My invention relates to means for lubricating leaf springs, and has particular reference to the provision of a suitable housing or casing for a leaf spring, wherein a lubricant may be contained within which the spring is arranged to operate.

The riding qualities of a vehicle are controlled largely by the springs whereon the body of the same is supported or suspended. In order that the best results may be obtained where leaf springs are used, it is necessary that the leaves be thoroughly lubricated so that they may act freely and thus provide the desired resilience. Proper lubrication of such springs furthermore contributes not only to the easy riding qualities of the vehicle, but also to the durability and life of the vehicle as well as of the spring itself. A further benefit obtained by the proper lubrication of leaf springs, particularly where the same are used upon automobiles, as is almost universally done, resides in an attendant reduction in the wear upon tires, as well lubricated springs permit the vehicle to pass more freely over road inequalities and obstructions; this results also in a saving of gasolene or other fuel.

The principal object of my invention is to provide means whereby the leaf springs of vehicles may be properly lubricated at all times, thereby achieving the benefits and advantages above mentioned.

Further objects of this invention will appear more fully from the following detailed description thereof.

In the drawings:

Figure 1 is a perspective of a leaf spring provided with a lubricating housing constructed in accordance with the present invention;

Fig. 2 is a similar view illustrating the spring in an inverted position, part of the housing being broken away;

Fig. 3 is a perspective of portions of the housing;

Fig. 4 is a perspective of the lining employed in the housing;

Fig. 5 is a central longitudinal section of a leaf spring and housing;

Fig. 6 is a cross-sectional view on line 6—6 of Fig. 1;

Fig. 7 is a perspective of the clamping bolts for securing the housing to the spring;

Fig. 8 is a longitudinal sectional view of a modification.

The numeral 1 indicates the middle portion of a housing for a leaf spring as embodying a preferred form of the present invention. The same is constructed of sheet metal or other suitable material and is substantially U-shaped in cross section, as clearly indicated in Fig. 3 of the drawings. Pivotally secured to the member 1 are end members 2 and 3, the same being also substantially U-shaped in cross section and being provided with slots 4 arranged to engage bolts or rivets 5 which also pass through perforations 6 in the member 1. The end members 2 and 3 are also made of sheet metal or other suitable material. The members 1, 2 and 3 assembled as above set forth are arranged to fit around the bottom and sides of a leaf spring 7, the member 1 being secured by the usual bolts or clips 8 used for securing the spring to the vehicle. Interposed between the housing and spring is a felt or other suitable lining 9 illustrated in detail in Fig. 4.

The end members 2 and 3 are provided with outwardly turned flanges 10, having bolt holes 11. Cover plates 12 are secured to the end plates 2 and 3 by means of bolts 13, which pass through the holes 11 in the flanges 10 and through registering holes in the plates. The lining 9 is provided with flanges 14 which lie between the flanges 10 and the cover plates when assembled. The flanges 10 are slit at the ends and bent over on the cover plates as shown at 15 in the drawings.

The housing consisting of the members 1, 2 and 3 and the cover plates 12 is of sufficient size to permit free and unobstructed movement of the leaves of the spring 7. The free ends of the members 2 and 3 are contracted as shown and are provided with end flanges 16. Clips 17 consisting of I-bolts are clamped about the ends of the members 2 and 3 adjacent the flanges 16 thus securing the ends of the housing to the spring.

Lubricant cups 18 are mounted on the housing at substantially the highest points thereof as shown in Figs. 1 and 2 of the drawings. The said cups serve the usual purpose of introducing a lubricant, the same passing from the cups into the housing and being distributed partially by gravity to the spring leaves. The lining 9 prevents leakage of the lubricant from the housing.

In Fig. 8 I have shown a modification of the housing the same being shown as a substantially rectangular casing or box 19 adapted to receive the spring, and a cover plate 20 arranged to fit upon said box.

The nature and operation of my invention will be apparent from the foregoing description to those skilled in the art to which the same appertains. The housing constructed and secured to a leaf spring as above set forth is adapted to receive and maintain a supply of lubricant within which the spring operates. The housing, as already stated, is of sufficient size to permit free and unobstructed movement of the spring, and itself moves with the spring by reason of the pivotal mounting of the end members 2 and 3 upon the member 1; the slots 4 permit also of longitudinal extension of the housing to compensate for any longitudinal stresses and strains which may be put upon it.

It will be understood that various modifications in details of the invention as above described may be made without departing from the spirit and scope of said invention, and I desire to have it understood that I do not confine myself to the specific embodiment of the invention disclosed in the drawings and this specification but deem as of my invention all such modifications as come fairly within the purview of the appended claims.

Having thus fully described my invention, what I claim as new and desire to secure by Letters Patent, is:

1. A device of the character specified, comprising in combination with a leaf spring, a housing for said spring, said housing comprising a middle section, end sections pivotally secured to said middle section, said middle and end sections being arranged to fit around the bottom and sides of said spring, and cover plates for said end sections, said housing being adapted to contain a supply of lubricant for said spring.

2. A device of the character specified, comprising in combination with a leaf spring, a housing for said spring, said housing comprising a middle section, end sections pivotally secured to said middle section, said middle and end sections being arranged to fit around the bottom and sides of said spring, cover plates for said end sections, said housing being adapted to contain a supply of lubricant for said spring, and a lining for said housing to prevent leakage of the lubricant therefrom.

JAMES I. RICHEY.